(12) United States Patent
Baudoin et al.

(10) Patent No.: US 6,338,697 B1
(45) Date of Patent: Jan. 15, 2002

(54) METHOD FOR CONTROLLING AN INTERNAL COMBUSTION ENGINE

(75) Inventors: Patrice Baudoin; Bernard Olivier, both of Asnieres (FR)

(73) Assignee: Renault Agriculture, Velizy Villacoublay (FR)

( * ) Notice: Subject to any disclaimer, the term of this patent is extended or adjusted under 35 U.S.C. 154(b) by 0 days.

(21) Appl. No.: 09/463,408

(22) PCT Filed: Jul. 29, 1998

(86) PCT No.: PCT/FR98/01687

§ 371 Date: Apr. 7, 2000

§ 102(e) Date: Apr. 7, 2000

(87) PCT Pub. No.: WO99/06238

PCT Pub. Date: Feb. 11, 1999

(30) Foreign Application Priority Data

Aug. 1, 1997 (FR) .............................. 97 09855

(51) Int. Cl.[7] .............................................. B60K 41/20
(52) U.S. Cl. .................... 477/203; 477/205; 477/207
(58) Field of Search ................ 477/203, 205, 477/207, 206

(56) References Cited

U.S. PATENT DOCUMENTS

| | | | | |
|---|---|---|---|---|
| 1,936,149 A | * | 11/1933 | Apple ........................ 477/205 |
| 3,331,478 A | * | 7/1967 | Trifiletti et al. ............. 477/207 |
| 3,338,357 A | * | 8/1967 | Hollins ....................... 477/205 |
| 3,354,743 A | * | 11/1967 | Strauss ........................ 477/207 |
| 3,495,692 A | * | 2/1970 | Holgate ...................... 477/207 |
| 3,667,020 A | * | 5/1972 | Senzaki | |
| 4,244,335 A | * | 1/1981 | deRussy ..................... 477/205 |
| 4,946,012 A | * | 8/1990 | Foster ........................ 477/206 |
| 5,439,429 A | * | 8/1995 | Lee ............................. 477/205 |
| 5,480,364 A | * | 1/1996 | Hilbert et al. ............... 477/107 |

FOREIGN PATENT DOCUMENTS

| | | | | |
|---|---|---|---|---|
| CA | 605066 | * | 9/1960 | ................. 477/205 |
| CA | 647489 | * | 8/1962 | ................. 477/205 |
| DE | 2952227 | * | 6/1981 | ................. 477/205 |
| DE | 4206291 | * | 12/1992 | |

* cited by examiner

Primary Examiner—Sherry Estremsky
(74) Attorney, Agent, or Firm—Oblon, Spivak, McClelland, Maier & Neustadt, P.C.

(57) ABSTRACT

A method for controlling an internal combustion engine provided on a vehicle and cooperating with the throttle hand lever and an accelerator pedal, whereby the amount of fuel is predetermined. The amount of fuel is predetermined by respective positions of the accelerator pedal and throttle hand lever and is corrected on the basis of a position of the vehicle brake pedal.

7 Claims, 2 Drawing Sheets

METHOD FOR CONTROLLING AN INTERNAL COMBUSTION ENGINE

BACKGROUND OF THE INVENTION

1. Field of the Invention

The present invention relates to a process for control of an internal combustion engine. The present invention relates more particularly to control of an internal combustion engine of an agricultural tractor.

2. Discussion of the background

It is known that two separate accelerators for controlling the engine load can be made available to the operator of an agricultural tractor, a first accelerator in the form of a pedal and a second accelerator in the form of a throttle lever. The accelerator pedal is usually returned automatically to idle position by a restoring spring, whereas the throttle lever is not provided with any mechanism for automatic return to idle position.

The position of these two separate accelerators is transmitted to an electronic device for monitoring the power delivered by the engine, which device then controls the engine as a function of the larger of the two signals. The electronic control box then acts directly on the quantity of fuel injected by control signal to the injectors or else to the fuel pump.

This arrangement has the disadvantage that it cannot respond to the action of the operator on the vehicle brake control or controls in such a way that the power delivered by the engine is reduced, canceled out or made negative, (engine brake), independently of the position of the accelerators, as soon as the operator applies the brakes.

SUMMARY OF THE INVENTION

The object of the present invention is therefore to remedy these disadvantages by providing an engine control process which takes into account both the action of the operator on the brakes and the position of the accelerators.

By virtue of this invention, in the example of braking on the highway at high speed when the operator has neglected to return the throttle lever to idle position, the brakes will no longer have to work against the propulsive power delivered by the engine. The result is therefore more effective braking, a shorter stopping distance, less heating of the brakes and therefore reduced wear thereof.

The process according to the invention for control of an internal combustion engine provided in a vehicle and cooperating with a throttle lever and an accelerator pedal operates on the principle of determining the quantity of fuel to be injected.

According to the invention, the process is characterized in that the quantity of fuel determined by the respective positions of the accelerator pedal and throttle lever is corrected as a function of the position of the brake pedal of the vehicle.

According to another characteristic of the process according to the invention for control of an internal combustion engine, depressing the brake pedal leads to limitation of the fuel supply to the point that the engine speed reaches the slow speed regardless of the respective positions of the accelerator pedal and throttle lever.

According to another characteristic of the process according to the invention for control of an internal combustion engine, the limitation of fuel supply is maintained for as long as the brake pedal is actuated.

According to another characteristic of the process according to the invention for control of an internal combustion engine, the depression of the brake pedal is taken into account only when the vehicle speed exceeds a given threshold speed.

According to another characteristic of the process according to the invention for control of an internal combustion engine, the limitation of fuel supply is maintained as long as the brake pedal is actuated and as long as the vehicle speed remains greater than the given threshold speed.

According to another characteristic of the process according to the invention for control of an internal combustion engine, when the vehicle speed exceeds the given threshold speed at the start of braking, the limitation of fuel supply is maintained as long as the brake pedal is actuated even when the vehicle speed drops below the said threshold speed.

According to another characteristic of the process according to the invention for control of an internal combustion engine, engine control by the throttle lever is disabled once the brake pedal has been depressed, and the engine is then controlled exclusively by the accelerator pedal, this situation being maintained until the operator returns the throttle lever to idle position.

BRIEF DESCRIPTION OF THE DRAWINGS

The objectives, aspects and advantages of the present invention will be understood more clearly from the description given hereinafter of an embodiment of the invention applied to a four-cycle controlled-ignition engine, this embodiment being given by way of nonlimitative example, with reference to the attached drawing, wherein.

DESCRIPTION OF THE PREFERRED EMBODIMENTS

The present invention relates more particularly to engine-powered vehicles provided with two separate accelerators which control the engine load as in, for example, agricultural tractors.

Figure 1:
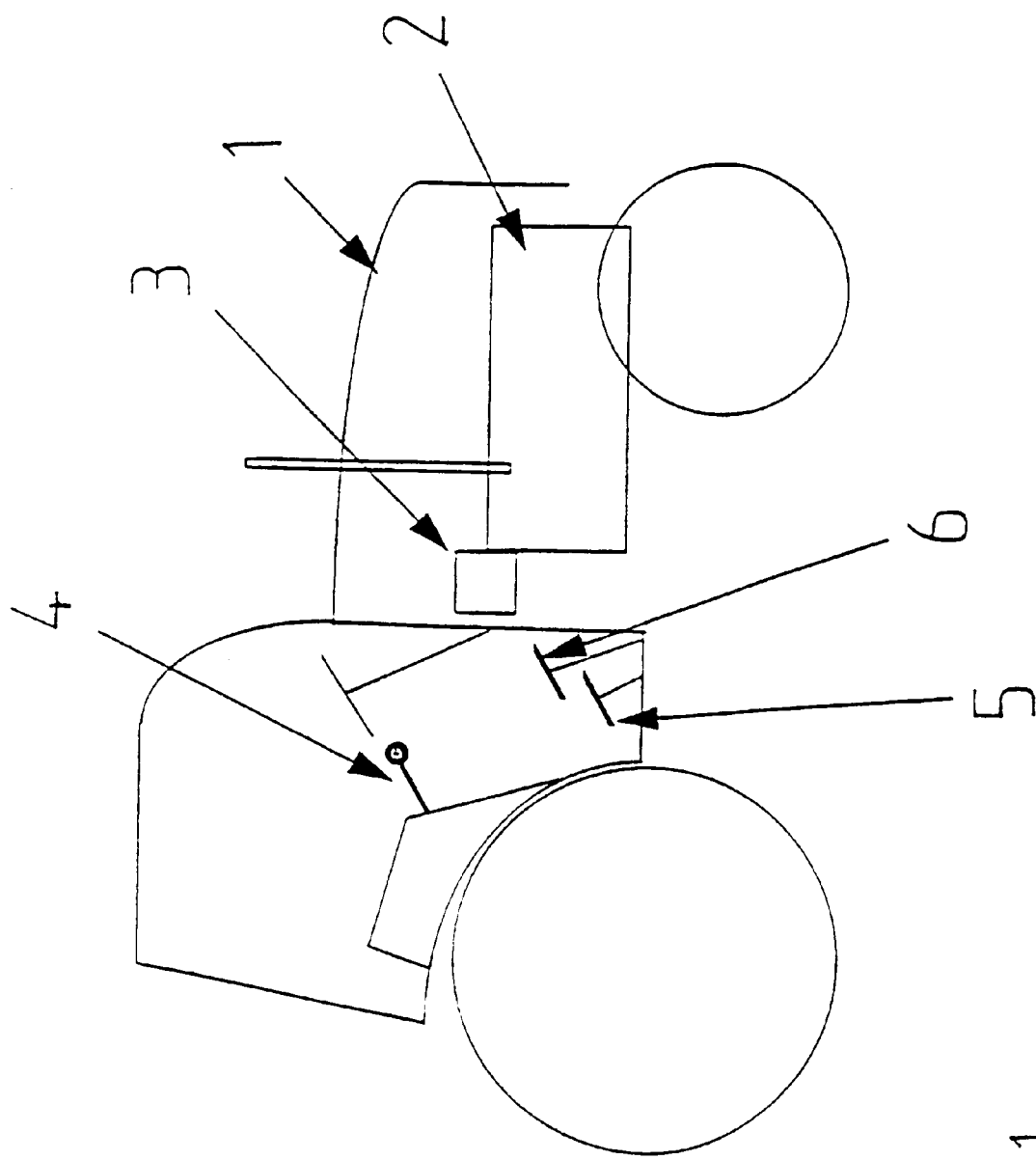
FIG. 1 is a schematic view of an agricultural tractor.

In the standard case, agricultural tractor 1 in FIG. 1 is provided with an internal combustion engine 2 of diesel type. This engine 2 possesses an electronic control box 3, which controls the supply of fuel to the engine in accordance with adapted strategies, derived in particular from the position of two separate accelerators. This box 3 acts directly on the opening of the fuel injector in the case of a circuit of "common rail" type, or else on the flow of the fuel pump in the case of an electronically controlled pump.

The two accelerators acting on the control of engine 2 comprise pedal 5, which is maneuvered by the operator's foot, and the second accelerator comprising lever 4, which is maneuvered by the operator's hand. Pedal 5 is returned automatically to idle position by an appropriate restoring mechanism, while lever 4 is not provided with any restoring mechanism. The displacement of each of the two accelerators 4 and 5 and the positions reached are transmitted to electronic control box 3, which then controls the fuel supply as a function of the larger of these two values.

According to the invention, the fuel supply is also determined by the electronic box as a function of the depression of brake pedal 6. Brake pedal 6 in question acts on the so-called "service" brakes, as opposed to the emergency or parking brakes, which are controlled by other means.

Figure 2:
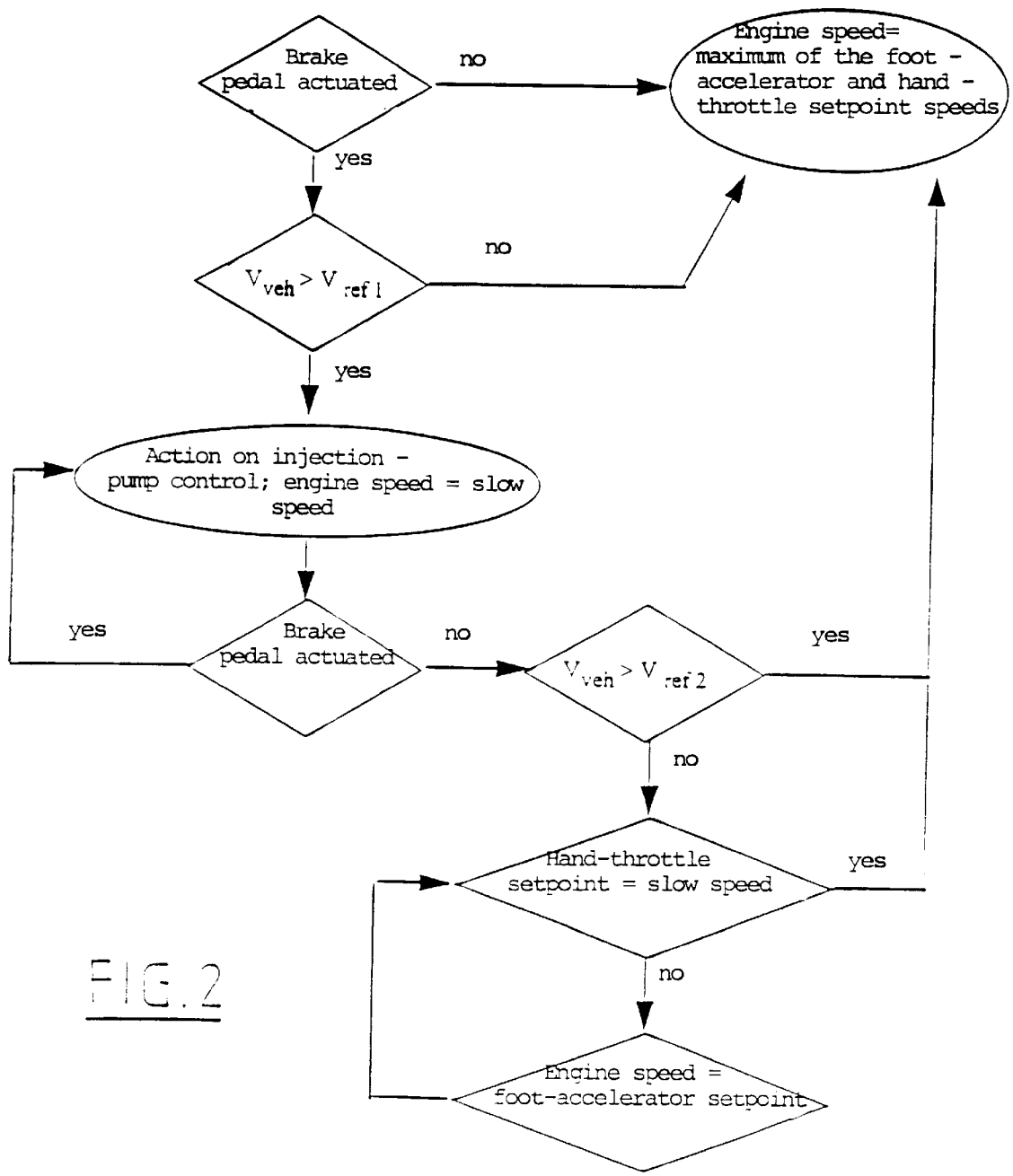
FIG. 2 is an algorithm describing the operation of the process according to the invention.

Referring to FIG. 2, there is illustrated an algorithm describing how the electronic control system takes into account the braking signals on the one hand and acceleration signals on the other.

The first stage comprises recognizing the position of the brake pedal. If the pedal is in idle position, the strategy used is the classical strategy of controlling the engine from the larger of the positions reached by accelerator pedal 5 and by throttle lever 4.

If, in contrast, the brake pedal actuated by the operator is depressed and leaves its idle position, a test is then performed on the speed of the vehicle. The information on vehicle speed is determined either by an appropriate device or by multiplying the engine speed by the transmission ratio.

Below a threshold speed Vref1, the actuation of the brake pedal is not taken into account as regards modifying the engine control strategy. The function of this strategy is in particular to ensure that, while vehicle 1 is moving forward slowly, any action on brake pedal 6 does not force lever 4 to be moved to idle position, as will be explained hereinafter, thus temporarily canceling the setpoint speed of engine 2 and therefore the forward speed of vehicle 1 given by the position of lever 4.

In addition, when vehicle 1 is moving at low speed, the propulsive power delivered by the engine is then low and its effect on braking is minimum.

As an example, a value of 10 km/h can be chosen for Vref1, thus covering almost all working speeds of the vehicle.

If the vehicle speed exceeds threshold speed Vref1, the fuel supply is reduced or even stopped in order to reduce the engine speed to the slow value in such a way as to reduce the engine power and therefore improve braking, regardless of the positions of the two accelerators and especially regardless of the position of lever 4.

This action on the fuel supply is exerted as long as the brake pedal is actuated, even if the vehicle speed drops below speed Vref1, and thus until complete stoppage of the vehicle if necessary.

When the brake pedal is released and allowed to return to idle position, a second test is then performed on the vehicle speed.

If the vehicle speed exceeds a threshold speed Vref2, the fuel supply is once again controlled in classical manner from the larger of the positions reached by accelerator pedal 5 and throttle lever 4.

In the case, in contrast, where the speed of vehicle 1 is lower than threshold speed Vref2, the position of lever 4 is then checked.

If lever 4 is in idle position, the engine is then again controlled in classical manner from the larger of the positions reached by accelerator pedal 5 and throttle lever 4. The operator can then once again choose the setpoint speed of the engine and therefore the forward speed of the vehicle by acting on lever 4.

If lever 4 is not in idle position, the engine is then controlled not from the larger of the positions reached by accelerator pedal 5 and throttle lever 4, but exclusively by the position given by accelerator 5, this situation being maintained until lever 4 is returned to its idle position, thus permitting reestablishment of classical operation in which the engine is then controlled from the larger of the positions reached by accelerator pedal 5 and throttle lever 4.

The object of this strategy is to ensure that the vehicle, once having been sharply slowed, does not reaccelerate suddenly to reach the setpoint speed given by the position of lever 4 in the case in which it was not returned to idle position during braking. Engine control by this lever 4 is therefore disabled as long as the operator has not returned it to idle position, and lever 4 does not become active once again with regard to engine control until it has been returned to its idle position.

The value Vref2 is therefore used to evaluate the intensity of braking imposed on the vehicle. As an example, a value of 10 km/h below the highway speed limit can be set for Vref2, and so Vref2 will be 30 km/h when the highway speed limit is 40 km/h.

Thus, if the vehicle speed after braking exceeds Vref2, it means that braking was not very significant and therefore that the vehicle can reaccelerate automatically in the case in which lever 4 remained in its active position. If, in contrast, the vehicle speed after braking is below Vref2, it means that braking was significant and therefore that it is more prudent to prevent automatic reacceleration of the vehicle if lever 4 has remained in its active position, unless the operator expressly requires such reacceleration by returning this lever first of all to its idle position before restoring it to its active engine-control position.

Of course, the invention is by no means limited to the described and illustrated embodiment, which was presented merely by way of example.

To the contrary, the invention comprises all technical equivalents of the described means as well as combinations thereof, provided such combinations are made in the spirit of the invention.

Thus it is possible to omit the step in which a test is made of whether the vehicle speed is below or above Vref1 and to reduce the fuel supply as soon as brake pedal 6 is actuated. Similarly, it is possible to omit the step in which a test is made of whether the vehicle speed is below or above Vref2, and therefore to return to controlling the fuel supply of the engine exclusively as a function of the respective positions of accelerator pedal 5 and throttle lever 4 as soon as the brake pedal returns to idle position.

Similarly, it is possible to take into account the position of a plurality of braking elements and not merely that of pedal 6 alone, especially when a plurality of braking controls exists.

What is claimed is:

1. A process for control of an internal combustion engine provided in a vehicle and cooperating with two separate accelerators including a throttle lever and an accelerator pedal, by means of which process a quantity of fuel to be injected is determined, characterized in that the quantity of fuel determined by respective positions of the accelerator pedal and throttle lever is corrected as a function of position of a brake pedal of the vehicle.

2. A process for control of an internal combustion engine according to claim 1, characterized in that depressing the brake pedal leads to limitation of the fuel supply to a point that an engine speed reaches a slow speed regardless of the respective positions of the accelerator pedal and throttle lever.

3. A process for control of an internal combustion engine according to claim 1, characterized in that a limitation of fuel supply is maintained for as long as the brake pedal is actuated.

4. A process for control of an internal combustion engine provided in a vehicle and cooperating with a throttle lever and an accelerator pedal, by means of which process a quantity of fuel to be injected is determined, characterized in that the quantity of fuel determined by respective positions of the accelerator pedal and throttle lever is corrected as a function of a position of a brake pedal of the vehicle, and characterized in that the depression of the brake pedal is taken into account only when a vehicle speed exceeds a given threshold speed.

5. A process for control of an internal combustion engine according to claim 4, characterized in that a limitation of fuel supply is maintained as long as the brake pedal is actuated and as long as the vehicle speed remains greater than the given threshold speed.

6. A process for control of an internal combustion engine according to claim 4, characterized in that, if the vehicle speed exceeds the given threshold speed at a start of braking, a limitation of fuel supply is maintained as long as the brake pedal is actuated, even when the vehicle speed drops below the threshold speed.

7. A process for control of an internal combustion engine provided in a vehicle and cooperating with a throttle lever and an accelerator pedal, by means of which process a quantity of fuel to be injected is determined, characterized in that the quantity of fuel determined by respective positions of the accelerator pedal and throttle lever is corrected as a function of a position of a brake pedal of the vehicle, and characterized in that control of the engine by the throttle lever is disabled once the brake pedal has been depressed, and the engine is controlled exclusively by the accelerator pedal until the throttle lever is returned to idle position.

* * * * *